United States Patent [19]
Linden et al.

[11] 3,928,276
[45] Dec. 23, 1975

[54] SALTS OF AMINE-ALKYLENE OXIDE ADDUCTS FOR PREVENTING SEDIMENTATION OF PIGMENT SUSPENSIONS

[75] Inventors: Heinz Linden, Dusseldorf-Holthausen; Jürgen Gärtner, Hitdorf; Wilhelm Offermann, Dusseldorf; Gunther Demmering, Solingen-Grafrath, all of Germany

[73] Assignee: Henkel & Cie G.m.b.H., Dusseldorf, Germany

[22] Filed: Jan. 29, 1973

[21] Appl. No.: 327,506

[30] Foreign Application Priority Data
Feb. 12, 1972 Germany............................ 2206691

[52] U.S. Cl.......... 260/34.2; 106/308 N; 106/308 F
[51] Int. Cl.²............................................ C08K 9/04
[58] Field of Search..... 106/308 N, 308 F; 252/356; 260/34.2

[56] References Cited
UNITED STATES PATENTS
2,160,119  5/1939  Brodersen...................... 106/308 N
3,446,569  5/1969  Braun............................ 106/308 N

*Primary Examiner*—Paul R. Michl
*Attorney, Agent, or Firm*—Hammond & Littell

[57]  ABSTRACT

The invention provides a method of using salts of tertiary and/or quaternary amine-alkylene oxide-adducts and organic acids as a means of preventing sedimentation of pigment suspensions in organic media, particularly solvent-containing paints.

6 Claims, No Drawings

SALTS OF AMINE-ALKYLENE OXIDE ADDUCTS FOR PREVENTING SEDIMENTATION OF PIGMENT SUSPENSIONS

PRIOR ART

In order to prevent the sedimentation of pigments of a higher specific gravity, like heavy spar, red lead, iron oxide red, iron mica, etc., in pigment suspensions, particularly in varnishes and paints, so-called suspension agents are used in practice. If the use of finely dispersed silica is disregarded, then in the majority of cases these agents are surface-active substances which are absorbed with proper treatment by the pigment particles in a very thin layer on the surface and which keep the suspended particles more or less suspended even in relatively small amounts, or prevent at least, to a great extent, the formation of hard sediments which can no longer be stirred up. While metal salts or amine salts of fatty acids, resin acids or naphthenic acids or other suitable carboxylic acids were used in the past for this purpose, the use of salts of surface-active sulfuric acid derivatives has recently become more widely used; however the salts of stable sulfuric acid semi esters have gained more importance in practice than those of true sulfonic acids.

In addition it has been tried by others to use high-molecular wax-like substances which were obtained, for example, by polymerization of alkylene oxides or by the action of several equivalents of alkylene oxide on alcohols, glycols, carboxylic acids, dicarboxylic acids or hydroxycarboxylic acids or by stepwise esterification of dicarboxylic acids with dihydric alcohols, in order to reduce the sedimentation of pigments. Furthermore long-chained dialkyl esters of sulfosuccinic acid have also been suggested to reduce sedimentation; however they were not satisfactory in practice.

OBJECTS OF THE INVENTION

It is an object of the present invention to provide a development in the process for preventing the sedimentation of pigment suspensions in organic preparations which comprise adding a sedimentation preventing agent to an organic preparation containing a pigment, wherein the improvement consists of utilizing a salt from tertiary and/or quaternary amine-alkylene oxide adducts and organic acids, as said sedimentation preventing agent.

Other and further objects of the present invention will become apparent as the description thereof proceeds.

DESCRIPTION OF THE INVENTION

The present invention is directed to a development in the process for preventing the sedimentation of pigment suspensions in organic preparations, particularly solvent containing paints, which comprises adding a sedimentation preventing agent to an organic preparation containing a pigment, wherein the improvement consists of utilizing a salt from tertiary and/or quaternary amine-alkylene oxide-adducts and organic acids of the formula $$K_x \cdot Y$$

wherein Y is an anion selected from the group consisting of fatty acids having 1 to 37 carbon atoms and dimeric fatty acids having 12 to 36 carbon atoms; $x$ is an integer from 1 to 2; and K is a cation of the formula selected from the group consisting of (A) 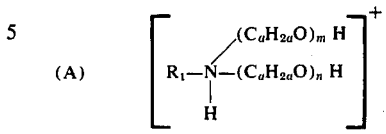

wherein $R_1$ is selected from the group consisting of saturated straight-chained or branch-chained aliphatic hydrocarbon radicals of 2 to 24 carbon atoms and unsaturated straight-chained or branch-chained aliphatic hydrocarbon radicals of 3 to 24 carbon atoms, a is an integer from 2 to 4, $m$ and $n$ are integers whose sum is from 2 to 40, (B) 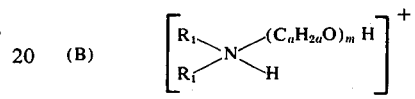

wherein $R_1$ and a each have the above-defined meaning, and $m$ is an integer from 2 to 40, and (C) 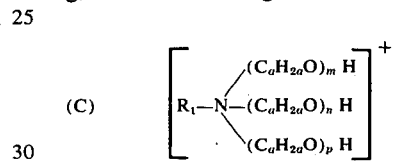

wherein R and a each have the above-defined meaning, and $m$, $n$ and $p$ are integers whose sum is from 3 to 100, as said sedimentation preventing agent.

For the production of the salts of tertiary and/or quaternary amine-alkylene oxide adducts and of organic acids according to the invention, solutions of the tertiary and quaternary amino-alkylene oxide adducts are neutralized with the respective carboxylic acids and then the water is distilled off, if necessary, under reduced pressure.

For the determination of the required amount of organic acid, a sample of the amine adduct was titrated with 0.5 nHCl; and the equivalent amount of organic acid was used for the production of the desired salt.

The tertiary amine-alkylene oxide adducts serving as a starting material can be produced according to the usual alkylene oxide addition methods with or without a catalyst, starting from primary or secondary amines, depending on the type of adduct desired. The quaternary ammonium bases used for the production of the salts can also be prepared in various ways. According to one method, the primary amine was first transformed in a first process step into the corresponding monoalkanolamine or dialkanolamine derivatives, and the latter in aqueous solution under careful pH control, that is, by adding acids, are quaternized with additional alkylene oxides. Another method consists in transforming the primary alkyl amines into salts, for example into hydrochlorides, and then reacting the latter in the presence of water with alkylene oxide. From the solutions of quaternary ammonium salts obtained according to the above mentioned two methods the solutions of the free bases can be obtained by additional process steps, for example anion-exchange by means of ion exchange resins or precipitation of the anion.

Another method for obtaining solutions of the free quaternary ammonium bases is disclosed in copending U.S. patent application Ser. No. 172,605 filed Aug. 17, 1971, in which primary amines containing an aliphatic hydrocarbon radical of 4 to 24 carbon atoms were reacted at temperatures of 40° to 100°C, preferably 50° to 70°C, under pressure with alkylene oxide in a molar ratio of at least 1:3 (amine: alkylene oxide) in the presence of at least 5 moles water per mole amine and in the absence of alkoxylation catalysts. The solutions of quaternary ammonium bases produced according to this method contain in addition, the tertiary amine alkylene oxide-adducts formed by the addition of alkylene oxide on the primary amines, in amounts which depend on the amount of alkylene oxide and water used.

Suitable examples of primary amine starting materials for the production of the tertiary and quaternary amine-alkylene oxide adducts are alkylamines having 2 to 24 carbon atoms such as ethylamine, propylamine, isopropylamine, butylamine, hexylamine, octylamine, dodecylamine, octadecylamine, behenylamine, eicosylamine; alkenylamines having 3 to 24 carbon atoms such as oleylamine; their homologous mixtures, particularly the so-called primary fatty amines, such as coconut fatty amines consisting of primary amines of the chain lengths having 8 to 18 carbon atoms as well as tallow fatty amine and others.

Suitable examples of secondary amine starting materials for the production of the tertiary amine alkylene oxide adducts are dialkylamines having 2 to 24 carbon atoms in the alkyl such as diethylamine, diisopropylamine, dibutylamine, ethyl-butylamine, dihexylamine, dioctylamine, dicoconut fatty amine, with diamines having the same hydrocarbon radicals being preferred because they are simpler to produce; as well as dialkenylamines having 3 to 24 carbon atoms in the alkenyl such as dioleylamine. Suitable examples of alkylene oxides which can be reacted with the amines to produce the tertiary or quaternary amine-alkylene oxide adducts are ethylene oxide, propylene oxide and butylene oxide. The reaction can be carried with only one type of alkylene-oxide, but mixtures, such as ethylene oxide and propylene oxide, can also be used. Of particular importance is ethylene oxide, whose amine adducts are particularly suitable for the present invention. The number of moles of alkylene oxide added per mole of amine can vary between 2 and 40 for the production of tertiary amine alkylene oxide adducts and between 3 and 100, preferably 4 and 40 for the production of quaternary amine-alkylene oxide products.

Suitable examples of carboxylic acids that can be used for the formation of salts with the tertiary and/or quaternary amine-alkylene oxide adducts are alkanoic acids of 1 to 37 carbon atoms such as formic acid, acetic acid, propanoic acid, butyric acid, capronic acid, caprylic acid, capric acid, undecylic acid, myristic acid, palmitic acid, stearic acid, arachic acid, and behenic acid; alkenoic acids of 9 to 24 carbon atoms such as oleic acid; hydroxyalkenoic acids of 12 to 24 carbon atoms such as ricinoleic acid; and alkadienoic acids of 12 to 24 carbon atoms such as linoleic acid. Also suitable are fatty acid fractions of 8 to 36 carbon atoms which can be obtained from natural oils and fats. Furthermore dimeric fatty acids of 12 to 36 carbon atoms are suitable which can be obtained according to known methods by dimerization of mono unsaturated and polyunsaturated fatty acids, having 6 to 18 carbon atoms, particularly fatty acid mixtures which form the basis of natural oils, like olive oil, rape seed oil, colza oil, coconut oil, palm oil, soybean oil, cottonseed oil, linseed oil.

Suitable examples of compounds to be used according to the invention are the salts of the following tertiary and quaternary amine-alkylene oxide adducts and organic acids:

a. tertiary:
ethylamine . 8 propylene oxide-butyric acid
butylamine . 10 ethylene oxide-acetic acid
butylamine . 10 ethylene oxide-capric acid
butylamine . 10 ethylene oxide fatty acid of linseed oil
coconut fatty amine . 11 ethylene oxide-capronic acid
butylamine . 10 propylene oxide-acetic acid
butylamine . 10 ethylene oxide-10 propylene oxide-coconut fatty acid
coconut fatty amine . 20 ethylene oxide-dimeric $C_{12}$ to $C_{18}$ fatty acids-neutral salt
diethylamine . 7 ethylene oxide-coconut fatty acid
dibutylamine . 15 ethylene oxide-capric acid
dicoconut fatty amine . 30 ethylene oxide-acetic acid b. quaternary:
ethylamine . 10 propylene oxide - capronic acid
butylamine . 10 ethylene oxide - acetic acid
butylamine . 4 ethylene oxide - ricinoleic acid
butylamine . 10 ethylene oxide - linoleic acid
butylamine . 10 ethylene oxide - dimeric $C_{12}$ to $C_{18}$ fatty acid salt
coconut fatty amine . 10 ethylene oxide-acetic acid
coconut fatty amine . 15 ethylene oxide-capronic acid
coconut fatty amine . 15 ethylene oxide - dimeric $C_{12}$ to $C_{18}$ fatty acid neutral salt The application of these agents according to the present invention, that is, the incorporation into the pigment suspensions, particularly in varnishes and paints to prevent sedimentation, is effected in the following known manner. The salts can be stirred into the finished varnishes in uncut or undiluted form, either before or after dilution or adjustment of the viscosity. But the agent can also be worked-in in the form of highly concentrated solutions or pastes, and the fact the salts are easily soluble in a number of highly volatile organic solvents is an additional advantage. This method of incorporation permits a particularly uniform adsorption by the pigment with a minimum expenditure of mechanical energy, such as supplied by stirring or mixing devices. Grinding of these agents together with the pigments during the production of the varnishes is also possible. Another possibility is the dry or wet grinding with the pigments in the course of the production of the latter, so that pre-treated pigments are obtained which only have to be mixed with the necessary binder during the subsequent grinding. This procedure, which is called "Coating Process" is already widely used in the pigment industry.

The amount of the sedimentation inhibitor to be added to achieve superior results are small and vary between 0.05 and 5% by weight, preferably between 0.1 and 2% by weight based upon the finished product, depending on the nature and the quality of the pigment and on the type and viscosity of the organic medium. The use of the sedimentation inhibitors in combination with other related or different varnish ingredients aids is possible.

The following examples are merely illustrative of the present invention without being limitative in any manner thereof.

EXAMPLE 1

Quaternary n-butylamine . 10 ethylene oxide - adduct.

Into a V4A-autoclave equipped with a stirrer was charged a solution of 115, 6 gm of n-butylamine in 1,890 gm water. This corresponds to a ratio of 66 moles water per mole amine. After deaeration with nitrogen and heating to 70°C, 694.7 gm ethylene oxide were added while keeping the temperature constant. The ratio of amine to ethylene oxide was 1:10. After a reaction time of 30 minutes, the reaction product was cooled to room temperature. A clear, colorless, highly basic liquid was obtained. For the determination of the amount of quaternary amine-ethylene oxide-adduct, 10 gm of the product were dissolved in 50 ml of isopropanol and titrated with 0.5NHCl to the phenolphthalein end point. From the consumption of HCl (11.1 ml) it was calculated that 98.4% of the total nitrogen were present in the form of quaternary bases.

For the production butylamine . 10 ethylene oxide-adduct acetic acid (A), a part of the solution of the quaternary adduct, prepared as described above, was neutralized with acetic acid to the phenolphthalein end point. The water was subsequently distilled from the solution of the salt by applying a low vacuum, and the quaternary ammonium salt was obtained as a highly viscous liquid.

Utilizing a procedure analogous to that described above the following quaternary amine-ethylene oxide-adduct-salts were produced as listed below, and were included in the investigations as substances B through Z along with ρ.

The salts of tertiary amine alkylene oxide-adducts were prepared according to conventional and well-known methods by first preparing the corresponding adducts and then mixing them later in aqueous solution with the equivalent amounts of the appropriate organic acids. Then the water was distilled off from the resulting solutions of the salts.

EXAMPLE 2

The following salts were tested for their sedimentation-preventing properties:

A. quaternary butylamine . 10 ethylene oxide-adduct-acetic acid
B. quaternary butylamine . 4 ethylene oxide-adduct-acetic acid
C. quaternary coconut fatty amine . 10 ethylene oxide-adduct-acetic acid
D. quaternary butylamine . 10 ethylene oxide-adduct-capronic acid
E. quaternary coconut fatty amine . 10 ethylene oxide-adduct-capric acid
F. quaternary butylamine . 10 ethylene oxide-adduct-coconut fatty acid
G. quaternary butylamine . 4 ethylene oxide-adduct-fatty acid of linseed oil
H. quaternary butylamine . 4 ethylene oxide-adduct - dimeric $C_{12}$ to $C_{18}$ fatty acid acid salt
J. quaternary butylamine . 4 ethylene oxide-adduct - dimeric $C_{12}$ to $C_{18}$ fatty acid neutral salt
K. quaternary butylamine . 10 ethylene oxide-adduct - dimeric $C_{12}$ to $C_{18}$ fatty acid acid salt
L. quaternary butylamine . 10 ethylene oxide-adduct - dimeric $C_{12}$ to $C_{18}$ fatty acid neutral salt
M. quaternary coconut fatty amine . 10 ethylene oxide-adduct - dimeric $C_{12}$ to $C_{18}$ fatty acid neutral salt
N. tertiary butylamine . 10 ethylene oxide-adduct-acetic acid
O. tertiary butylamine . 10 ethylene oxide-adduct-capronic acid
P. tertiary butylamine . 10 ethylene oxide-adduct-capric acid
Q. tertiary butylamine . 10 ethylene oxide-adduct-coconut fatty acid
R. tertiary butylamine . 10 ethylene oxide-adduct-fatty acid of linseed oil
S. tertiary butylamine . 10 ethylene oxide-adduct - dimeric $C_{12}$ to $C_{18}$ fatty acid acid salt
T. tertiary butylamine . 10 ethylene oxide-adduct - dimeric $C_{12}$ to $C_{18}$ fatty acid neutral salt
U. tertiary coconut fatty amine . 11 ethylene oxide-adduct - dimeric $C_{12}$ to $C_{18}$ fatty acid acid salt
V. tertiary coconut fatty amine . 11 ethylene oxide-adduct - dimeric $C_{12}$ to $C_{18}$ fatty acid neutral salt
W. tertiary diethylamine . 7 ethylene oxide-adduct-acetic acid
X. tertiary dibutylamine . 15 ethylene oxide-adduct-acetic acid
Y. tertiary dibutylamine . 15 ethylene oxide-adduct-capric acid
Z. tertiary butylamine . 10 ethylene oxide . 10 propylene oxide-adduct-acetic acid
ρ. tertiary dicoconut fatty amine . 30 ethylene oxide-adduct-capric acid
π. commercial sedimentation preventive.

The test for the sedimentation-preventing action was carried out with the air-drying alkyd resin varnish listed below, which was ground with pigments showing a great tendency to sedimentation. Then 0.2% and 0.5% by weight respectively, based upon the total varnish composition of the above mentioned 100% salts were stirred in. However in order to facilitate this incorporation into the finished varnish, the following solutions of the salts were utilized:

```
50 parts by weight pure salt
35 parts by weight pure cyclohexanol
15 parts by weight pure water
100 parts by weight total
```

The evaluation of the sedimentation-preventing effect was made after the samples were stored for 2 months. The results are presented in Table I, in which 0 = no sediment; 1 = light sediment; 2 = moderate sediment; 3 = great sediment; and 4 = very great sediment.

Air-drying Alkyd Resin Varnish 400 gm long oil-linseed oil alkyd resin 67% oil content, 60% in test benzene
114 gm titanium dioxide
141 gm yellow zinc
141 gm heavy spar
1.5 gm cobalt naphthenate 6% Co
4.0 gm lead naphthenate, 24% Pb
1.5 gm methylethyl ketoxime
28 gm decahydronaphthalene
169 gm test benzene.

TABLE I

| Product | Sedimentation 0.2% | Sedimentation 0.5% | Product | Sedimentation 0.2% | Sedimentation 0.5% |
|---------|--------------------|--------------------|---------|--------------------|--------------------|
| —       | 4                  | 4                  | O       | 1 – 2              | 0 – 1              |
| A       | 2 – 3              | 2                  | P       | 2 – 3              | 1 – 2              |
| B       | 2 – 3              | 1 – 2              | Q       | 2 – 3              | 1                  |
| C       | 2 – 3              | 2                  | R       | 2 – 3              | 1                  |
| D       | 3                  | 2 – 3              | S       | 2                  | 0 – 1              |
| E       | 3                  | 2 – 3              | T       | 2                  | 0 – 1              |
| F       | 3                  | 1 – 2              | U       | 3                  | 1 – 2              |
| G       | 3                  | 2 – 3              | V       | 3                  | 1 – 2              |
| H       | 2 – 3              | 1 – 2              | W       | 3                  | 2 – 3              |
| J       | 2 – 3              | 0 – 1              | X       | 3                  | 1 – 2              |
| K       | 2 – 3              | 0 – 1              | Y       | 3                  | 2                  |
| L       | 2                  | 0                  | Z       | 3                  | 2 – 3              |
| M       | 3                  | 1 – 2              | ρ       | 3                  | 2 – 3              |
| N       | 1 – 2              | 0                  | π       | 4                  | 2                  |

The foregoing table shows that an excellent sedimentation preventing effect can be achieved with the products according to the invention.

EXAMPLE 3

The test for influencing the film properties and the varnishing properties of varnishes which were provided with additions of the salts according to the invention were made on an air-drying and on an oven-drying varnish system.

1. Air-drying alkyd resin varnish 540 gm long oil-alkyd resin with 68% oil content, 75% in test benzene
325 gm titanium dioxide
4 gm calcium naphthenate, 4% Ca
2 gm cobalt naphthenate, 6% Co
7 gm lead naphthenate, 24% Pb
15 gm dipentene
20 gm decahydronaphthalene
3 gm methylethyl ketoxime
77 gm test benzene.

2. Oven-drying alkyd-melamine resin varnish 410 gm ricinenol alkyd resin 26% oil portion, 60% in xylene/butanol
150 gm Luwipal 013 (R), 55% in butanol (BASF)
290 gm titanium dioxide
4 gm Siegle red B(R), Siegle & Co.
3 gm calcium naphthenate, 4%Ca
25 gm butanol 17 gm ethylene glycol
101 gm xylene
Heating conditions: 10 to 15 minutes at 120°C.

For the varnish quality test, one varnish system with an addition of 1% salt of product C according to the invention and 1% salt of product N according to the invention were compared with a varnish system without addition of said salt (blank). The following results were obtained:

TABLE II

| Test criterion | Air-drying varnish 1 blank | Air-drying varnish 1 1% salt C | Air-drying varnish 1 1% salt N | Oven-drying varnish blank | Oven-drying varnish 1% salt C | Oven-drying varnish 1% salt N |
|---|---|---|---|---|---|---|
| Layer Thickness in μ | 40 | 42 | 47 | 51 | 49 | 47 |
| % gloss (45° to length) | 100 | 102 | 100 | 103 | 101 | 100 |
| Adhesion DIN 53,157 | 1 | 1 | 1 | 4 | 4 | 4 |
| Pendulum hardness DIN 53,157 | 98 | 94 | 96 | 102 | 98 | 103 |
| Ericsson grid test DIN 53,156 | 9.6 | 9.5 | 9.4 | 5.3 | 6.0 | 5.9 |
| Impact grid test | 0.5 | 0.5 | 0.5 | 2.0 | 1.5 | 2.5 |
| dust | 2.0 | 2.5 | 2.0 | — | — | — |
| Drying thorough | 5.5 | 7.0 | 6.0 | — | — | — |
| Yellowing 72 h UV | G 11 | G11-21 | G11-21 | G11-21 | G11-21 | G11-21 |
| DIN 6167 72h,60°C | G11-21 | G11-21 | G11-21 | G11-21 | G11-21 | G11-21 |

As it can be seen from the foregoing table, the addition of salts from tertiary or quaternary amine-alkylene oxide-adducts and organic acids does not yield any marked changes in the varnish quality behavior of the varnish.

EXAMPLE 4

For testing the influence on the corrosion preventing behavior by the addition of salts from tertiary or quaternary amine-alkylene oxide adducts and organic acids, plates coated with the above mentioned air-drying alkyd resin varnish (1) were subjected to the salt spray test. The test varnish was sprayed on degreased steel plates with and without the addition of the salt according to the invention. The dry film thickness was about 35 mμ. After thorough drying for one week, the steel plates were subjected according to ASTM B 117-61 to continuous spraying with 5% common salt solution. The values obtained for the corrosion behavior are compiled in Table III.

TABLE III

| Spraying time in days | 1 | 5 | 9 | 16 | 30 |
|---|---|---|---|---|---|
| varnish 1, blank | 101 | 202 | 312 | 413 | 444 |
| varnish 1 with 1% salt C | 101 | 201 | 301 | 413 | 554 |
| varnish 1 with 1% salt N | 101 | 201 | 301 | 412 | 554 |

In the three-digit values the first digit indicates rust developed at the cutting cross, where 0 = undamaged
1 = slight rust at cutting cross
2 = rust at cutting cross less than 1 mm wide, beginning blisters
3 = rust at cutting cross 1–2 mm wide, large blisters, sporadic rusty areas
4 = rust at cutting cross larger than 2 mm, large blisters
5 = considerable rust, varnish film detached.

The second digit indicates the rust development on the undamaged surface, where

0 = no rust
1 = 0.5–1% covered with rust
2 = about 5% covered with rust
3 = about 15% covered with rust
4 = about 30–40% covered with rust 5 = over 50% covered with rust.

The third digit indicates the formation of blisters on the undamaged varnish surface, where 0 = blister-free
1 = sporadic small blisters
2 = a few small blistery areas
3 = larger blistery areas
4 = large blisters on the entire surface.

The salt spray test shows that the addition of salts from tertiary and quaternary amine-alkylene oxide-adducts and organic acids has no unfavorable effect on the corrosion preventing behavior of varnish films.

The advantages of using the salts according to the invention from tertiary and/or quaternary amine-alkylene oxide adducts and organic acids include preventing the sedimentation of pigments even in those suspension and paints which contain pigments with a great tendency to undergo sedimentation, without having an unfavorable effect on the technological and corrosion preventing behavior of the coatings produced therefrom. The favorable corrosion preventing behavior of the products according to the invention is so pronounced that there is no under-rusting even if the paints provided with them are applied on moist surfaces.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the process for preventing the sedimentation of pigment suspensions in varnishes with an organic solvent, comprising adding a sedimentation preventing agent to a varnish with an organic solvent containing a pigment, the improvement which consists of utilizing a salt from tertiary and/or quaternary amine-alkylene oxide adducts and organic acids of the formula $$K_x \cdot Y$$

wherein Y is an anion of an acid selected from the group consisting of fatty acids having 1 to 37 carbon atoms and dimeric fatty acids having 12 to 36 carbon atoms; $x$ is an integer from 1 to 2; and K is a cation of the formula selected from the group consisting of (A) 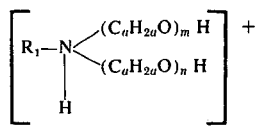

wherein $R_1$ is selected from the group consisting of alkyl having 2 to 24 carbon atoms and alkenyl having 3 to 24 carbon atoms, $a$ is an integer from 2 to 4, $m$ and $n$ are integers whose sum is from 2 to 40, (B) 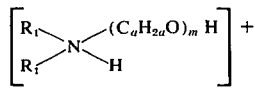

wherein $R_1$ and $a$ each have the above-defined meaning, and $m$ is an integer from 2 to 40, and (C) 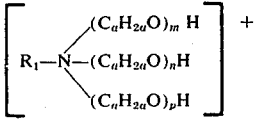

wherein $R_1$ and $a$ each have the above-defined meaning, and $m$, $n$ and $p$ are integers whose sum is from 3 to 100, as said sedimentation preventing agent.

2. The process according to claim 1, in which Y is an anion selected from the group consisting of alkanoic acids of 1 to 37 carbon atoms, alkenoic acids of 9 to 24 carbon atoms, alkadienoic acids of 12 to 24 carbon atoms, hydroxyalkenoic acids of 12 to 24 carbon atoms, and dimeric fatty acids of 12 to 36 carbon atoms.

3. The process according to claim 1, in which said alkylene oxide is ethylene oxide.

4. The process according to claim 1, in which from 0.05 to 5% by weight based upon the finished preparation of said sedimentation preventing agent is added to said preparation.

5. The process according to claim 4, in which from 0.1 to 2% by weight based upon the finished preparation of said sedimentation preventing agent is added to said preparation.

6. The process according to claim 1, in which the sum of $m$, $n$ and $p$ is from 4 to 40.

* * * * *